June 17, 1947.    R. J. PARSONS    2,422,312
DAMPER CONTROL
Filed Aug. 19, 1944
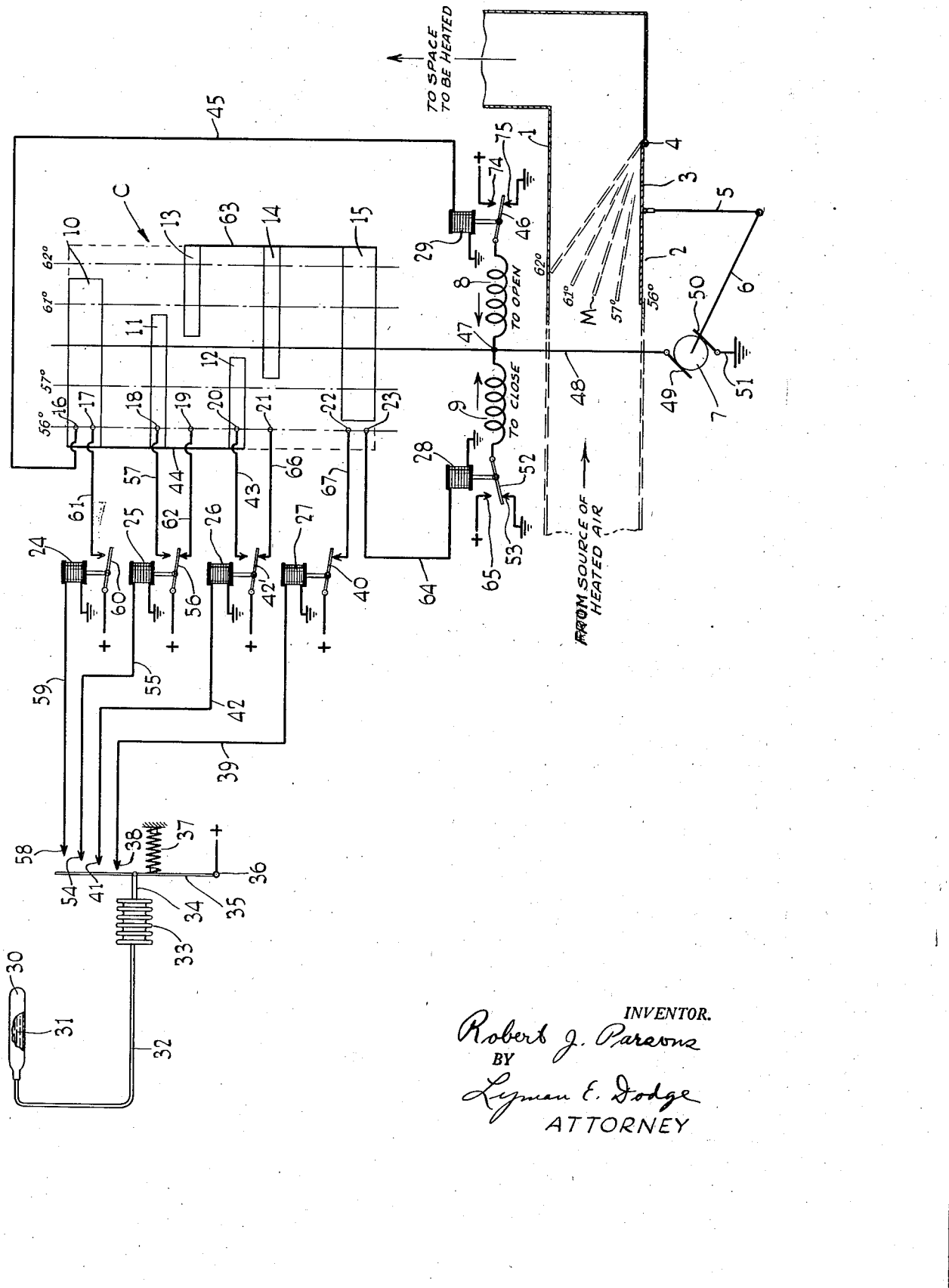
INVENTOR.
Robert J. Parsons
BY
Lyman E. Dodge
ATTORNEY Patented June 17, 1947

2,422,312

UNITED STATES PATENT OFFICE 2,422,312

DAMPER CONTROL

Robert J. Parsons, Schenectady, N. Y., assignor to Consolidated Car Heating Company, Inc., Albany, N. Y., a corporation of New York Application August 19, 1944, Serial No. 550,206

1 Claim. (Cl. 236—76)

This invention relates to heating and ventilating, particularly the heating and ventilating of a vehicle such as a bus or street car.

A principal object of this invention is the provision of a construction and arrangement whereby heated air may be diverted to a by-pass more or less by a valve or damper which may be moved by steps from a mid position to either extreme position, but will move from either extreme to a mid position in one movement.

Other objects and advantages will appear as the description of the particular physical embodiment selected to illustrate the invention progresses and the novel features will be particularly pointed out in the appended claims.

In describing the particular physical embodiment selected to illustrate the invention, reference will be had to the accompanying drawing.

The single figure of the drawing is a schematic or diagrammatic view of a device and arrangement embodying my invention.

In the figure, numeral 1 designates a conduit connecting to a source of heated fluid, preferably air. This conduit connects with a space to be heated. Intermediate the connection to the source of heated fluid and the space to be heated, the conduit is provided with an opening or by-pass 2.

A valve or damper 3 is pivoted at 4 and is of such size that it just closes the opening or by-pass 2 when it is in the closed position, as shown in the figure in full lines. If swung upon the pivot 4 it may occupy various intermediate positions up to the full open position in which it completely obstructs the flow of heated air in the conduit 1, and allows all of it to flow out through the opening or by-pass 2. A mid position, designated M in the drawing, is fixed for the damper 3. This mid position may be an actual geometrical or mechanical mid position or not. In fact in some cases it may be desirable to have the so-called mid position about one-third of the way toward the open position.

The damper 3 is connected by linkage 5 and 6 to a rotatable electric motor armature 7. This motor armature is caused to rotate in opposite directions by suitably passing electric current through what I will call the opening field winding 8 or the closing field winding 9.

A commutator drum, designated as a whole by C, is mechanically connected to and moves synchronously with the damper 3, that is, both are moved by the armature 7. This rotatable or oscillatable drum C has metallic conducting strips 10, 11, 12, 13, 14 and 15 mounted thereon with which metallic fingers or brushes 16, 17, 18, 19, 20, 21, 22 and 23 contact as will be more fully explained hereinafter.

Relays, as 24, 25, 26, 27, 28 and 29 are provided by which suitable contacts are made or broken to complete or break circuits.

Means for governing motion armature 7 responsive to the temperature and changes thereof in the space to be heated are provided. This means may assume various forms. I prefer a vessel such as 30 containing a fluid 31 positioned in the space to be heated and communicating by a capillary tube, as 32, to a Sylphon or collapsible and expansible bellows 33. It is immaterial whether the bellows is placed directly in the space to be heated or is positioned at a convenient place, as shown, and operated by the thermostatic device 30. The bellows 33 is connected, as by a link 34, to a movable member 35, preferably pivoted as at 36, and spring-pressed by spring 37.

All parts of the device are shown in the sketch in the positions which they would assume if the temperature of the space to be heated is less than, say 56° F.

If with all of the parts in the position as shown in the figure, the temperature in the space to be heated rises to 56°, the pivoted circuit closing arm 35 would contact with point 38. Current would then flow from positive terminal of a source of potential to pivot 36, through arm 35, contact point 38, wire 39, relay 27, and to the other terminal of the source of potential or to common. Current flowing in the above traced path would energize relay 27 and would raise armature 40 without having any effect, otherwise, upon the system.

If the temperature in the space to be heated further rises to 57°, pivoted circuit closing arm 35 would contact point 41 and current would flow in a circuit as follows: positive terminal of a source of potential, pivot 36, arm 35, contact point 41, wire 42, relay 26, and to the other terminal of the source. Current flowing in the above traced path would cause armature 42' to be raised and then current could flow in a path as follows: positive terminal of a source of potential, relay armature 42', wire 43, brush 20, segment 12, wire 44, segment 10, brush 16, wire 45, relay 29 and to the negative terminal of the source. Current flowing in the above traced path would energize relay 29 and raise armature 46. When armature 46 is raised, current could flow in a path as follows: positive terminal of a source of potential, front contact 74, relay armature 46, opening field coil 8 to junction 47 at which place the current will divide. One path from the point 47 is through wire 48, brush 49, armature 7, brush 50 and by wire 51 to the negative terminal of the source. The other circuit from connection 47 would be through closing coil 9, relay armature 52 and back contact 53 to the negative terminal of the source. Current flowing in the above traced paths would energize the opening winding 8 properly and also the closing winding 9 so as to cause the motor armature 7 to rotate in such direction that the damper 3 is moved toward open position and the drum C is moved to carry segment 12 out from under brush 20. When brush 20 ceases to contact commutator segment 12 at what I have called the mid position, relay 29 will become deenergized and motor armature 7 will cease to rotate, leaving damper 3 in the mid position.

If the temperature of the space to be heated further increases, the controlling armature 35 will contact the contact point 54 so that current will flow in a path as follows: positive terminal of a source of potential, pivot 36, circuit controlling arm 35, contact point 54, wire 55, relay 25 and to the negative terminal of the source. Current in the above traced path will energize relay 25 and raise its armature 56 so that then current can flow in a path as follows: positive terminal of a source of potential, armature 56, wire 57, brush 18, segment 11, wire 44, segment 10, brush 16, wire 45, relay 29, and to the negative terminal of the source. Current in the above traced path will again cause armature 46 to be raised and will so cause armature 7 to again rotate and move damper 3 to the 61° position, that is, until commutator segment 11 moves out from under brush 18 and breaks the circuit of relay 29.

If the temperature in the space to be heated further rises to 62°, the circuit controlling arm 35 will contact point 58 and a circuit will be formed in which current will flow as follows: positive terminal of a source of potential, pivot 36, circuit controlling arm 35, point 58, wire 59, relay 24, and to the negative terminal of the source. Current flowing in the above traced path will energize the relay 24 and cause armature 60 to be raised thereby forming a circuit in which current flows as follows: positive terminal of a source of potential, relay armature 60, wire 61, brush 17, commutator segment 10, brush 16, wire 45, relay 29, and to the negative terminal of the source. Current flowing in the above traced path will again energize relay 29 and so cause its armature 46 to be raised thereby causing motor armature 7 to again rotate and move damper 3 to the full open position, that is, to the 62° position in which the duct 1 is completely closed off from the space to be heated, and is completely opened to the bypass or atmosphere. The motor will no longer rotate when the drum C has moved so that brushes 17 and 16 are no longer over segment 10, that is, when segment 10 moves beyond them.

If the temperature of the space to be heated should fall when all the parts are in the 62° position, then circuit controlling arm 35 would first break contact with contact 58 thereby denergizing relay 24, but no change in position of any of the other parts would take place.

If the temperature of the space to be heated further falls to 61°, circuit controlling arm 35 would break contact with the 61° contact point 54 and would thereby deenergize relay 25. When this relay is deenergized, its armature 56 would make contact with wire 62 and so with brush 19 and then as brush 19 is bearing at the 62° position on commutator segment 13, a circuit would be formed as follows: positive terminal of a source of potential, armature 56, wire 62, brush 19, commutator segment 13, wire 63, commutator segment 15, brush 23, wire 64, relay 28 and common. Current flowing in the above traced path would energize relay 28 and cause its armature 52 to be raised so that a circuit would be formed as follows: positive terminal of a source of potential, front contact 65, armature 52, closing winding 9 and to junction 47. At this point the circuit would divide and one path would be through wire 48 and the motor armature and the other through the opening winding 8 and relay armature 46, to the back contact 75. The current flowing through the field windings 9 and 8 would, in this case, be in such direction as to cause a reverse rotation of the motor armature 37 so that the armature 7 would move so that the damper would be moved toward the closed position from the 62° position, and would in fact be moved to the mid position, that is, the movement would continue until commutator segment 13 moves out from under brush 19 at which time energization of relay 28 would cease.

If the temperature further dropped below 57°, circuit controlling arm 35 would break contact with contact 41 and so deenergize relay 26, thus causing armature 42' to contact wire 66, so that a circuit would be formed as follows: positive terminal of a source of potential, relay armature 42', wire 66, brush 21, commutator segment 14, wire 63, commutator segment 15, brush 23, wire 64, relay 28 and to the negative terminal of the source. Current flowing in the above traced path would energize relay 28 and cause its armature 52 to be raised thereby again energizing the electric motor armature 7 and cause the linkage to move the damper 3 toward and to the 57° position at which point the brush 21 would become disconnected from commutator segment 14 as that commutator segment moves out from underneath it.

If the temperature of the space to be heated drops still further so that it gets below 56°, circuit controlling arm 35 breaks contact with contact 38 and so deenergizes 27 so that its armature 40 makes contact with wire 67 so that a circuit is formed as follows: positive terminal of a source of potential, relay armature 40, wire 67, brush 22, commutator segment 15, brush 23, wire 64, relay 28 and to the negative terminal of the source. Current flowing in the above traced path would again energize relay 28 and cause armature 52 to be raised and so electric motor armature 7 would be energized and the linkage 5 and 6 would move damper 3 to the 56° position or full closed position, at which position the relay 28 would become deenergized because commutator segment 15 would have moved out from underneath brushes 23 and 22, so that the system will again be in the position and condition as shown in the figure of the drawing.

From the hereinbefore given description it will be seen that my arrangement and connections are such that a damper, such as 3, is moved from a full closed position, that is, the 56° position as shown in the figure, to the mid position and then successively to the 61° position and to the 62° position or full open position, that is by steps from the mid position to the full open position.

It will also be seen from the system and arrangement that when the damper is in a full open position it is movable to a mid position and then by steps to the full closed position.

Although I have particularly described one particular physical embodiment of the idea of means underlying my invention, nevertheless, I desire to have it understood that the form selected is merely illustrative but does not exhaust the possible physical embodiments of the idea of means underlying my invention.

What I claim as new and desire to secure by Letters Patent of the United States, is:

In a heating system, including, in combination: means responsive to the temperature in the space to be heated; means for supplying heated fluid; a duct between said second-named means and the space to be heated, said duct provided with an intermediate by-pass opening; a damper adapted to close and open said by-pass and open or close said duct; a rotary electric motor having an opening field coil and a closing field coil; a linkage between said motor and said damper whereby the damper may be operated to close or open said by-pass; a commutator provided with contact fingers and metallic strips also connected to said motor and operable synchronously with said damper; two motor relays each having front and back electrical contacts and each having an armature, the armature of one relay connected to the opening coil and the armature of the other relay connected to the closing coil; a plurality of operating electrical contacts and a pivoted contact lever, said electrical contacts positioned to be contacted successively as said contact lever is oscillated in one direction and to be disengaged as said contact lever is oscillated in an opposite direction, said pivoted lever connected to and operated by said first-named means; a governing relay associated with each operating electrical contact, each governing relay provided with an armature and the relays connected to the extreme points having one a front electrical contact only and the other a back electrical contact only, the other relays each having both front and back electrical contacts; electric circuits connecting said operating electrical contacts and said governing relays, whereby said relays are successively operated by said first-named means; electric circuits connecting the front and back electrical contacts of said governing relays, said commutator strips and contact fingers and said motor relays whereby the motor relays are operated; and electric circuits connecting the armatures and the front and back electrical contacts of said motor relays and said opening and closing field coils of said motor so that when the armature of one motor relay is up and the other down current will flow in said motor coils in one direction and when the armature of the one motor relay is down and the other up current will flow in said motor coils in an opposite direction whereby said motor is operated in reverse directions whereby the damper is operated to different positions between open and closed positions and means for supplying electrical energy to all of said circuits.

ROBERT J. PARSONS.

REFERENCES CITED

The following references are of record in the file of this patent:

UNITED STATES PATENTS

| Number | Name | Date |
|---|---|---|
| 2,029,615 | Gille | Feb. 4, 1936 |
| 1,985,539 | Hartwig | Dec. 25, 1934 |
| 1,015,204 | Murray | Jan. 16, 1912 |
| 1,523,403 | Cope | Jan. 20, 1925 |
| 2,322,054 | Parsons | June 15, 1943 |
| 2,009,823 | Van Volpen | July 30, 1935 |
| 2,392,290 | Parsons | Jan. 1, 1946 |